United States Patent [19]

Kemper

[11] Patent Number: 4,630,494

[45] Date of Patent: Dec. 23, 1986

[54] RADIALLY ORIENTED NUTATIONAL TRACTION DRIVE TRANSMISSION

[76] Inventor: Yves J. Kemper, 1371 Kirkway Rd., Bloomfield Hills, Mich. 48013

[21] Appl. No.: 724,746

[22] Filed: Apr. 18, 1985

Related U.S. Application Data

[63] Continuation-in-part of Ser. No. 705,647, Feb. 26, 1985, abandoned, and a continuation-in-part of Ser. No. 694,964, Jan. 25, 1985, abandoned.

[51] Int. Cl.⁴ .................... F16H 15/44; F16H 15/16
[52] U.S. Cl. ........................................ 74/191; 74/796
[58] Field of Search .................... 74/190, 190.5, 191, 74/193, 796, 690

[56] References Cited

U.S. PATENT DOCUMENTS

| | | | |
|---|---|---|---|
| Re. 29,328 | 8/1977 | Kemper | 74/191 |
| Re. 30,981 | 6/1982 | Kemper | 74/193 |
| 2,079,681 | 5/1937 | Chilton | 74/796 |
| 3,695,120 | 10/1972 | Titt | 74/690 |
| 4,112,780 | 9/1978 | Kemper et al. | 74/191 |
| 4,266,446 | 5/1981 | Fritsch | 74/796 |
| 4,435,997 | 3/1984 | van Doorne | 74/796 |
| 4,524,642 | 6/1985 | Fritsch | 74/796 |

Primary Examiner—Lawrence J. Staab
Attorney, Agent, or Firm—Robert F. Ziems

[57] ABSTRACT

A continuously variable traction drive transmission of the class including three working bodies, two of which are concentric with a first transmission axis, the other of which is concentric with a second axis intersecting and inclined with respect to the first axis, and wherein the angle of intersection subtending the axes is large acute angle so that the points of rolling friction contact always lie between the intersecting transmission axes. The body concentric with the second axis includes two oppositely convergent cone-like rolling surfaces of revolution about the second axis which are held in rolling friction engagement with annular plate-like members forming one of the two bodies concentric with the first axis. The other of the two bodies concentric with the first axis carries the body on the second in nutation and continuously variable speed ratios are achieved by adjusting the cone members relative to the plate members.

23 Claims, 10 Drawing Figures

RADIALLY ORIENTED NUTATIONAL TRACTION DRIVE TRANSMISSION

CROSS-REFERENCE TO RELATED APPLICATION

This is a continuation-in-part of U.S. Applications Ser. No. 694,964, filed Jan. 25, 1985, now abandoned, and Ser. No. 705,647, filed Feb. 26, 1985, now abandoned.

BACKGROUND OF THE INVENTION

This invention relates to continuously variable transmissions and, more particularly, it concerns a unique geometry for such transmissions by which such factors as the range of available speed ratios, reduction in overall transmission length, and adaptability to existing power train configurations is improved relative to prior transmissions of comparable performance.

U.S. Pat. Nos. Re. 29,328, Re. 30,981 and 4,112,780 exemplify several embodiments of a continuously variable, mechanical power transmission in which three frame-supported working bodies operate to transmit a mechanical power input to a rotatable output at infinitely variable output/input speed ratios within the design range of the transmission. For purposes of definition in this background discussion as well as in the ensuing detailed description of the present invention and in the appended claims, the three working bodies may be termed, respectively, an "alpha body" which is supported by the transmission frame to be concentric with a first or primary transmission axis, a "beta body" which is supported by the alpha body to be concentric with a second axis inclined with respect to and intersecting the first axis at a point of axes intersection, and an "omega body" carried by the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission.

It is to be noted that the terms "alpha body," "beta body" and "omega body" are completely arbitrary and as such, do not restrict the components designated thereby either to the class of transmission represented by the disclosure of to the aforementioned patents or to specific structure to be described hereinafter. The terms will, however, lend consistency of definition in the description to follow and facilitate an understanding of various speed relationships to be expressed by algebraic equations.

The continuously variable speed ratio capability of such transmissions is achieved by providing one of the beta and omega bodies with a pair of rolling or traction surfaces which are of revolution about the concentric body axis and which are of variable radii along that axis in symmetry with the point of first and second axes intersection. Physically, the rolling surfaces thus defined may be provided at the ends of a generally cylindrical beta body rolling against generally plate-like omega body members as in U.S. Pat. No. Re. 29,328, or one of the beta and omega bodies may be of biconical configuration and extend within the other of the beta and omega bodies, the latter being manifested as a pair of ring members as represented by several of the embodiments disclosed in U.S. Pat. No. Re. 30,981. The pairs of rolling surfaces on the beta and omega bodies are retained in frictional engagement with each other at two contact points or zones capable of positional adjustment to vary the ratio of the beta body surface radius ($R_b$) to the omega body surface radius ($R_w$). Thus, if the alpha body is rotatable at a velocity ($\overset{\circ}{\alpha}$) about the first axis, the rotational speed of the beta body about the second axis in the ($\overset{\circ}{\alpha}$) frame of reference is ($\overset{\circ}{\beta}$) and the rotational speed of the omega body on the first axis is ($\overset{\circ}{\omega}$), then the respective speeds of the three bodies are related by the following equation:

$$\overset{\circ}{\omega} - \overset{\circ}{\alpha} + \overset{\circ}{\beta} \cdot R_b/R_n = 0. \tag{1}$$

A generally preferred mode of operating such transmissions has been to apply an input torque to the alpha body to carry the beta body in nutation and hold the omega body against rotation ($\overset{\circ}{\omega}=0$). The beta body is linked with an output shaft rotatable on the first axis by gearing having a ratio factor (k) which theoretically may be of any value and also may be made either positive or negative depending on the particular gearing arrangement used. In light of the foregoing, where $\overset{\circ}{\theta}$ is unit output speed and taking into account the gearing ratio (k), the output/input speed ratio of the unit is determined by an equation:

$$\overset{\circ}{\theta}/\overset{\circ}{\alpha} = 1 - k\rho. \tag{2}$$

A principal advantage of operating in the mode represented by equation (2) is that the physical parameters of such transmissions readily accommodate a range of values for the function ($K\rho$) which permit a continuously variable output/input speed ratio range of from zero to 1 ($1.0 < k\rho > 2.0$). Also, this range may be shifted to include an output reversal through zero merely by selecting a gear ratio (k) so that the function ($k\rho$) brackets a numerical value of 1 (e.g., $1.5 > k\rho > 0.7$).

A geometric characteristic common to all embodiments of traction drive transmissions represented by the disclosures of the cited patents is that the points of rolling friction contact, which are in a plane containing the first and second axis, always lie outside of the areas of that plane subtended by the first and second axes. This characteristic of the prior transmissions is due in part to the relatively small angle subtending the first and second axes but the size of that angle is not the sole contributing factor. The geometric variation available to rolling surface configuration is also a factor. Although a wide variety of rolling surface configurations may be used in the prior transmission embodiments, it is believed that the described geometric characteristic has the effect of limiting the range of available beta/omega surface radius ratios and thus the intrinsic speed ratio range of the transmission.

While traction drive transmissions of the class exemplified by the aforementioned patents have demonstrated a capacity for highly efficient operation in the transmission of power at any speed ratio within the range of the transmission design, the geometry of such transmissions is also restrictive to dimensional proportioning. For example, in embodiments involving circumferential enclosure of the beta and omega bodies, one within the other, speed ratio range is limited to variation of the radius ratio factor $\rho$ which can be achieved by axial movement of the omega rings along the surfaces of the beta cones. Increased speed ratio range can be accomplished either by additional gearing or by increasing the axial length of the transmission. While the increased length is not a problem to many drive line applications, it can be a serious impediment to use of the transmission particularly in automobile drive trains where space available for an engine/transmission assembly is limited. This is especially true of front-wheel drive power trains for automotive vehicles.

SUMMARY OF THE PRESENT INVENTION

In accordance with the present invention, the problems associated with dimensional proportioning and speed ratio range in prior continuously variable traction drive transmissions of the class described, are substantially avoided by orienting the axis of the beta body or the "second axis" with respect to the axis of the alpha body or the primary transmission axis so that the previously defined points of rolling friction contact always lie between the first and second axes.

The beta body is again retained by the alpha body in rolling frictional engagement at the two points of contact with an omega body which is in the form of a pair of annular plates disposed on opposite sides of the beta body. The radius ratio affecting output speed is a function of both the varying radius of the cone members on the beta body and a varying radial distance between the beta/omega contact points and the primary transmission axis. The alpha body is a disk-like member with a maximum thickness at its center adequate to encompass the near radially oriented beta body. The assembly of the alpha and beta bodies approaches in configuration that of a thick flywheel and may be used as such in an automotive drive line, for example. Moreover, the overall transmission length is little more than the combined width of the maximum diameter of the beta body and the thickness of the plate-like omega bodies.

In one embodiment, cone members of the beta body are splined or otherwise slidably mounted for rotation with a common supporting shaft which, in turn, is restrained against axial movement from a position of radial balance with the alpha body. The axial position of the cone members on the shaft is controlled preferably by hydraulic piston/cylinder units. Power output from the transmission is from a stub shaft rotatable on the primary transmission axis and coupled directly to the shaft of the beta body by bevel gearing.

In an alternative embodiment, the cone members are integral with the shaft of the beta body and variation in radius ratio is effected by varying the angle of first and second axes intersection in combination with variation of the spacing between the omega plates. In this instance, as well as with the first-mentioned embodiment, power output may be taken from a gear keyed to the beta body, through an idler gear rotatably supported on the alpha body, and to an output gear rotatable concentrically with the alpha body on the first axis.

In a further alternative embodiment, the omega plates are maintained in fixed positions as a result of a beta body construction capable of effecting the radius ratio variation needed for a range of speed ratios. In this embodiment the beta body cones are adjustable along the second axis as in the first mentioned embodiment and, in addition, the angle of axes intersection is adjustable as in the second embodiment A principal object of the present invention is, therefore, the provision of a nutational traction drive transmission having a geometry which contributes both to increased speed ratio range and shortness of overall transmission length. Other objects and further scope of applicability of the present invention will become apparent from the detailed description to follow, taken in conjunction with the accompanying drawings in which like parts are designated by like reference characters.

DETAILED DESCRIPTION OF THE PREFERRED EMBODIMENTS

Figure 1:
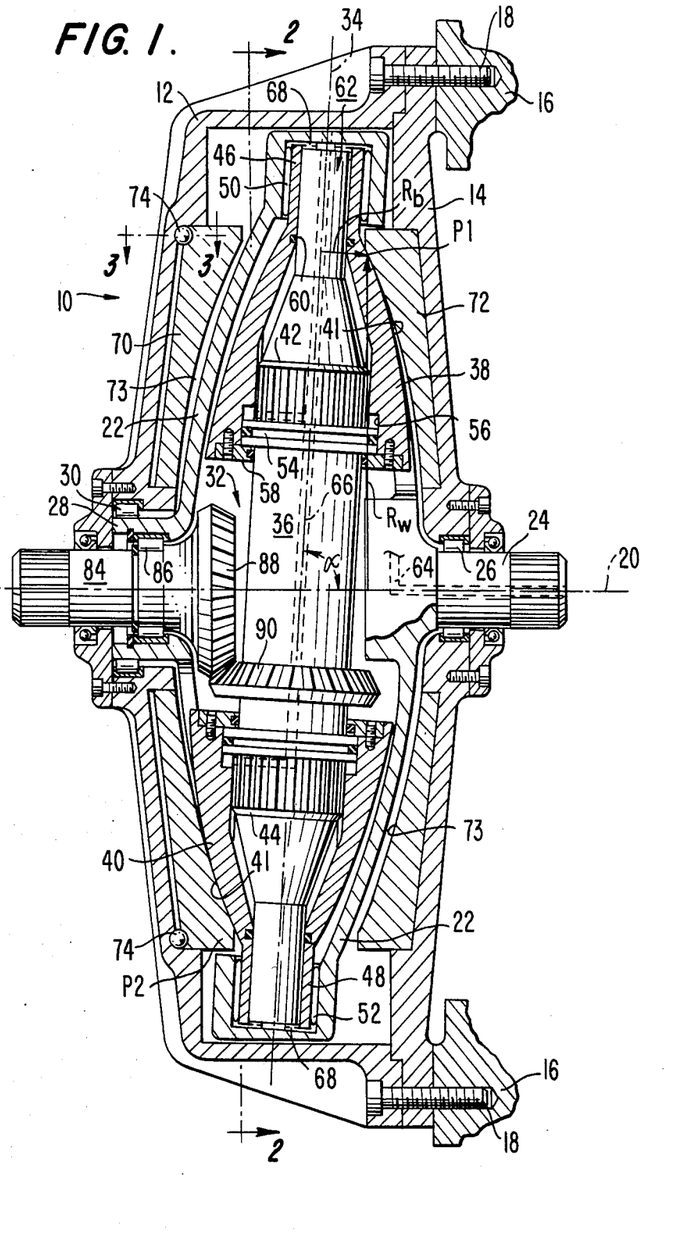
FIG. 1 is a cross section in a longitudinal plane containing the intersecting transmission axes of one embodiment of the invention.

In FIG. 1 of the drawings, an embodiment of a transmission unit in accordance with the present invention is generally designated by the reference numeral 10 and shown to include a frame in the form of a casing having two annular parts 12 and 14 secured to each other and to a fixed support 16 by bolts 18. It will be appreciated that the fixed support 16 may be the block of an engine, for example or the frame of a power plant (not shown).

Supported within the casing 12, 14 for rotation on a first axis 20 is a disk-like alpha body 22. An input shaft 24 in the illustrated embodiment extends integrally from one side of the alpha body 22 and is rotatably supported on the axis 20 from the casing part 14 by a bearing 26. The opposite side of the alpha body 22 projects as an integral hub 28 supported also for rotation on the axis 20 by a bearing 30 in the casing part 12. The bearings 26 and 30 are designed to permit axial movement of the shaft 24 and the hub 28 relative to the casing parts 12 and 14 for reasons to be explained below. In this context, the hub 28 and shaft 24 are shown in the extreme left positions in FIG. 1.

A beta body of overall biconical configuration in the illustrated embodiment is designated generally by the reference numeral 32 and is supported by the alpha body for rotation on a second axis 34 which intersects the first axis 20 at an angle $\alpha$, which in the illustrated embodiment, approaches but is less than 90°. The beta body is an assembly of components including a central shaft 36 supporting a pair of beta cone members 38 and 40 at opposite ends. Each of the cone members 38 and 40, in the embodiment of FIG. 1, define an external convex beta rolling surface 41 of revolution about the second axis 34. The cones 38 and 40 are linked for rotation with the shaft 36 by splines 42 and 44 on the equivalent thereof so as to be adjustable along the second axis 34 relative to the shaft 36. The cones 38 and 40 terminate at their outer ends in cylindrical bearing sleeves 46 and 48 which are supported in the alpha body 22 by needle bearings 50 and 52, respectively.

The axial position of the cones 38 and 40 is controlled by hydraulic piston/cylinder units, which for the cone 38, is defined by a piston 54 secured on the shaft 36 and in sealing engagement with an inner cylindrical surface 56 on the cone 38. An annular seal 58 secured to the base of the cone 38 establishes a seal with the inner portion of the shaft 36 whereas an O-ring seal or equivalent 60 effects a sliding seal between the sleeve 46 of the cone 38 and a cylindrical end portion 62 on the shaft 36. The hydraulic piston/cylinder unit for the cone 40 is identical to that described for the cone 38 so that no further description thereof will be given. Hydraulic fluid under pressure to both piston/cylinder units is supplied through the shaft 24 by way of a port 64 through the end of the alpha body 22 to a central conduit 66 in the shaft 36.

The shaft 36 is retained against movement on the axis 34 by thrust bearings 68 between opposite ends of the shaft and the alpha body 22. Thus, all reaction to forces exerted on the cones 38 and 40 by hydraulic pressure, centrifugal force and the like is absorbed in the shaft 36 and the alpha body 22.

Figure 3:
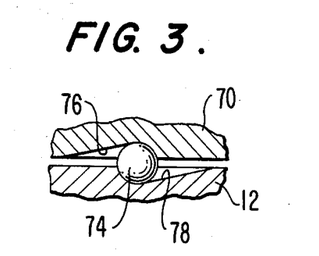
FIG. 3 is an enlarged fragmentary cross section on line 3—3 of FIG. 1.
Figure 4:
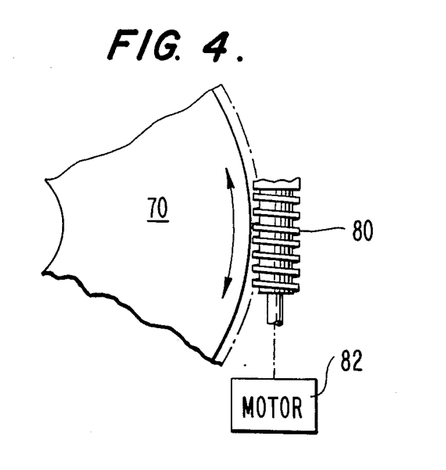
FIG. 4 is a fragmentary side elevation illustrating schematically an adjusting mechanism for the omega plates of the invention.

Supported by the respective casing parts 12 and 14 of the transmission frame are a pair of annular omega plate-like members 70 and 72 each having a radially concave omega rolling surface 73 of revolution about the first axis 20 in the illustrated embodiment to cooperate with the shape of the cones 38 and 40 thereof. In a functional context, the omega plates 70 and 72 are fixed against rotation with respect to the casing parts 12 and 14 though one or both may be rotatably adjustable as a means for varying the distance between the two plates 70 and 72. In the illustrated embodiment, the plate 72 is fixed to the casing part 14. The plate 70, on the other hand, is supported against the interior of the housing part 12 by balls 74. As may be seen in FIGS. 3 and 4, the balls 74 lie in ramps 76 and 78 machined in the plate 70 and casing part 12, respectively. By rotational adjustment of the plate 70, such as by a worm 80 under the control of a motor 82 as shown in FIG. 4, the balls 74 and ramps 76 and 78, arranged symmetrically about the plate 70, will operate to advance the plate 70 axially toward and away from the casing part 12 and thus toward and away from the opposing omega plate 72.

Power output from the transmission unit 10 is through a stub shaft 84 supported for rotation on the first axis 20 independently of the alpha body by bearings 86 between the shaft 84 and the inside of the alpha body hub 28. The shaft 84 carries a bevel gear 88 in mesh with a bevel gear 90 which is keyed or otherwise linked for direct rotation with the beta body shaft 36.

Figure 2:
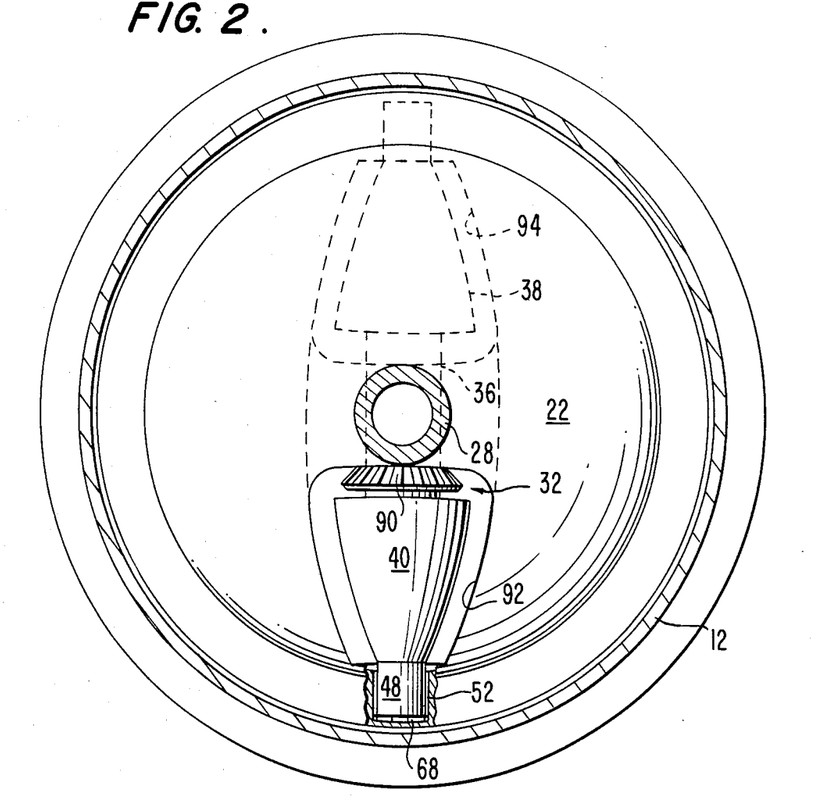
FIG. 2 is an end elevation in partial section on line 2—2 of FIG. 1, at a reduced scale, illustrating one side of the transmission alpha body in the embodiment of FIG. 1.

The disk-like configuration of the alpha body 22 may be appreciated from the illustration in FIG. 2 of the drawings. The beta body 32 is supported within the alpha body 22 so that the cones 38 and 40 are presented at opposite sides through windows 92 and 94 in the alpha body. Also, it will be appreciated that although the alpha body is illustrated in the drawings as a single part, it may, in practice, be formed of two parts divided in a central radial plane to facilitate assembly of the beta body therein. The two parts could then be secured such as by bolting throughout the region unoccupied by the end journals on the beta body 32 and the windows 92 and 94.

In light of the foregoing and with reference again to FIG. 1 of the drawings, it will be appreciated that because of the angle $\alpha$ between the axes 20 and 34, the cones 38 and 40 of the beta body 32 are presented one to each side of the alpha body 22. As a result, the outer rolling surface 41 of the cone 38 will engage the rolling surface 73 on omega plate 72 at a point P1 whereas the surface 41 of the other cone 40 will engage the surface 73 on the omega plate 70 at a point P2. Thus, the effective radius of the beta body, $R_b$, will be determined by the location of the contact points P1 and P2 along the axial extent of the surfaces 41 on the cones 38 and 40. The effective radius of the omega plates 70 and 72 or $R_W$ is the distance from the first axis 20 out to the respective contact points P1 and P2. In light of the geometry of the transmission, the radius ratio $\rho$ can be made to vary from a value of approximately 1 to a maximum value of approximately 6. Also the ratio factor k of the gears 88 and 90 may be designed so that the radius or number of teeth on the beta shaft carried gear 90 divided by the number of teeth or radius of the gear 88 on the output shaft will have a value of 1 or slightly under 1 such as for example 0.8. Assuming the gear ratio factor k to be 0.8 the range of output/input speed ratios available may be appreciated by substituting the given numeric values of $\rho$ and k in equation (2) above.

Thus, where $\rho = 1$, as when the contact points P1 and P2 are closest to the first axis 20, the output/input ratio will be +0.2 whereas when $\rho = 6$, as when the contact points are remote by positional take the positioning shown in FIG. 1, the output/input ratio will be −3.8. Moreover, it will be seen that the transmission can accommodate a modest range of ratios in one direction, be adjusted to a zero output (k$\rho$ = 1), and provide a significant range of speed ratios in the opposite direction which would correspond to "forward" drive in a vehicle.

Operation of the illustrated embodiment in accordance with equation (2) is accomplished by initially driving the alpha body in rotation to carry the beta body in forced precession with the axis 34 revolving on the first axis 20 and with the cones 38 and 40 retained by hydraulic force so that k$\rho$ = 1. The orbital movement of the cones 38 and 40 will correspond directly to the input speed or the rotational speed of the alpha body but with no rotation of the shaft 84. Thereafter, the plates 70 and 72 may be adjusted outwardly and the cones 38 and 40 forced outwardly into frictional engagement with the plates 72 and 70 to progressively increase the radius ratio and the value of the function k$\rho$. Rolling friction of the cones 38 against the fixed omega plates 70 and 72 causes rotation of the shaft 36 and gear 90 to drive the output gear 80 and output shaft 84. Adjustment in the radius ratio is effected by the control motor 82 and resulting movement of the omega plates 70 and 72 toward and away from one another. As the plates 70 and 72 move toward each other, the cones 38 and 40 are adjusted inwardly by hydraulic pressure in the respective piston/cylinder units, toward the axis 20, to increase the radius $R_b$ and decrease the radius $R_w$ or to decrease the ratio factor $\rho$. The force required to avoid slippage of the cones on the plates is provided by a combination of centrifugal force and force developed by the hydraulic piston/cylinder units associated with each of the cones and the axially fixed shaft 36. Also and because of the above described axial freedom in the bearings 26 and 30, the alpha body is permitted a small range of axial movement where adjustment of the omega plates is effected by movement of only one such plate. In this way the alpha and beta bodies will be centered between the omega plates 70 and 72.

Figure 5:
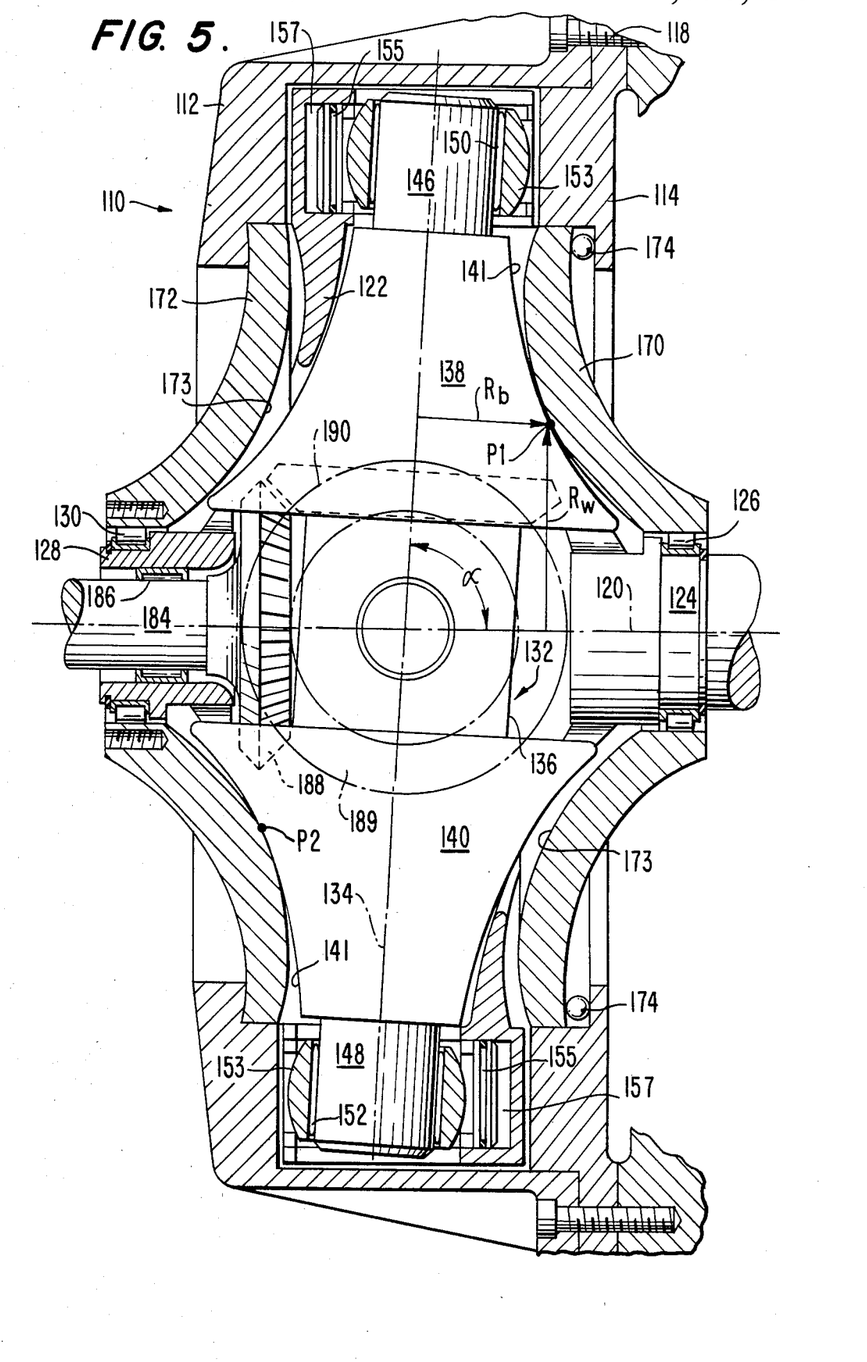
FIG. 5 is a cross section like FIG. 1 but illustrating an alternative embodiment of the invention.

An alternative embodiment of the invention is illustrated in FIG. 5 of the drawings where parts corresponding directly to parts previously described with reference to FIGS. 1–4 are designated by reference numerals to which the value 100 has been added. Hence as in the previous embodiment, the transmission unit 110 in FIG. 5 includes a frame defined by a pair of housing parts 112 and 114, an alpha body 122 rotatable about a first axis 120, a beta body 132 concentric with a second axis 134 and a pair of omega plates 170 and 172 which define opposed omega surfaces 173 of revolution about the first axis 120. The major difference between the transmission embodiment 110 of FIG. 5 and the embodiment of FIGS. 1–4 is that the cone members 138 and 140 of the beta body 132 are integral or otherwise fixed directly to a central shaft section 136. The radius ratio $R_w/R_b$ is adjusted in this embodiment of the invention by axial movement of the omega plates 170 and 172 toward and away from each other as in the previous embodiment but with a corresponding adjustment in the angle $\alpha$ subtending the intersecting first and second axes 120 and 134. To achieve this latter adjustment, cylindrical end portions 146 and 148 of the beta body 132 are journaled by needle bearings 150 and 152 in externally spherical races 153 pivotally associated with hydraulic pistons 155 operating in hydraulic cylinders 157 at the outside of the alpha body 122. In light of this arrangment, an increase in the angle $\alpha$ will result in a shifting of the contact points P1 and P2 inwardly or toward the base of the cones to increase the radius $R_b$ and reduce the radius $R_w$. Correspondingly, a decrease in the angle $\alpha$ will shift the points P1 and P2 outwardly to decrease the radius $R_b$ and increase the radius $R_w$.

In the embodiment of FIG. 5, the convex/concave relationship of the beta and omega surfaces 141 and 173 respectively, is inverted or reversed with respect to the embodiment shown in FIG. 1, for example. In other words, the cone members 138 and 140 are defined by generatrices about the second axis 134 which are axially concave whereas the generatrices defining the omega surfaces 173 are convex to complement the surface configurations of the cone members 138 and 140. While the curves defining the generatrices of the respective beta and omega surfaces 141 and 173 may assume a wide variety of curvilinear configurations, where the generatrices are the arcs of a circle, it is required only that the radius of curvature defining the concave beta surfaces 141 be larger than the radius of curvature defining the omega surfaces 173. The inverse of this relationship is also true of the embodiment illustrated in FIG. 1.

The output gearing in the transmission embodiment 110 of FIG. 5 differs from that shown in FIG. 1 primarily to accommodate the variable angle $\alpha$ between the first and second axes 120 and 134. Specifically, a bevel gear 188 on the output shaft 184 is again used but, in this instance; it meshes with an idler bevel gear 189 carried by the alpha body 122 to be rotatable on an axis perpendicular to a plane including the first and second axes 120 and 134. The idler gear 189 meshes with a bevel gear 190 fixed to the cone member 138 which cooperates in rolling friction contact with the omega plate 170 located opposite from the output shaft 184. Because of this latter relationship, meshing of the gears 190 and 188 will be avoided. The inclusion of the idler 189 allows meshing of the gears 190, 189 and 180 as simple bevel gears without any adverse effect as a result of varying the angle $\alpha$ between the first and second axes 120 and 134 which, as indicated, lie in a plane perpendicular to the axis of the idler gear 189.

Figure 6:
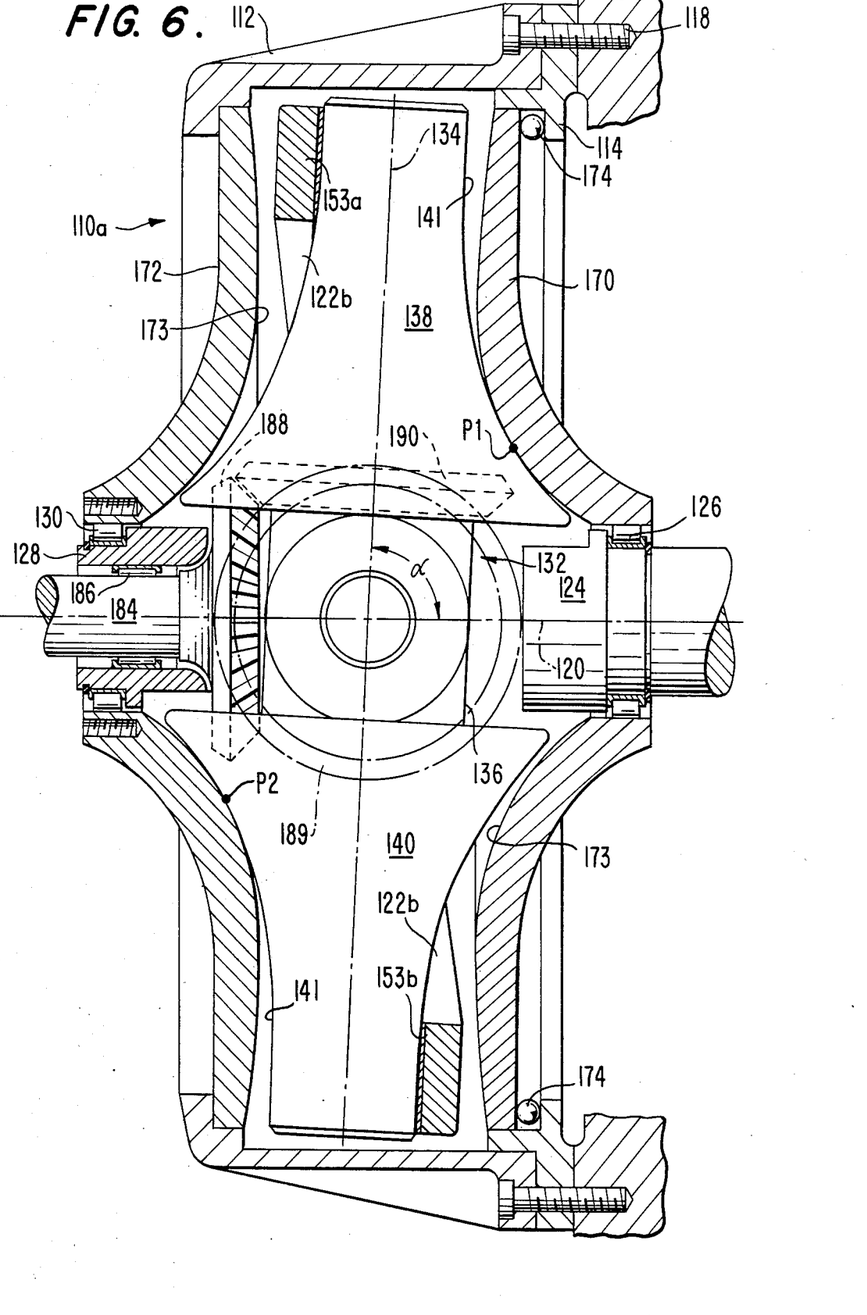
FIG. 6 is a cross section illustrating a variation of the alternative embodiment illustrated in FIG. 5.
Figure 7:
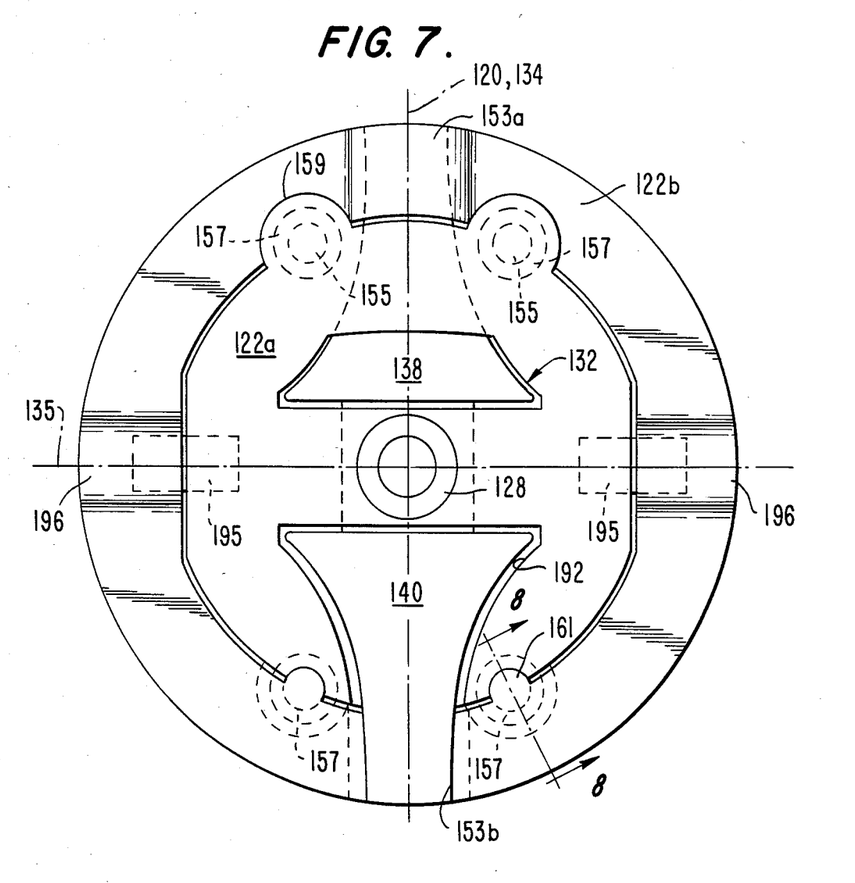
FIG. 7 is an end elevation similar to FIG. 2 but illustrating the alpha and beta bodies of the embodiment of FIG. 6.
Figure 8:
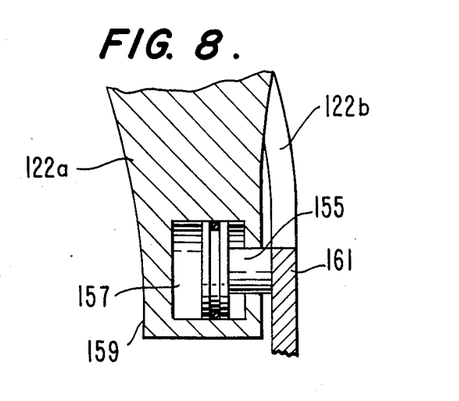
FIG. 8 is an enlarged fragmentary cross section on line 8—8 of FIG. 7.

A variation of the embodiment described with reference to FIG. 5 is illustrated in FIG. 6–8 of the drawings. In FIGS. 6–8, the reference numerals used in FIG. 5 are repeated for those parts which are identical in structure and function.

From the illustration in FIG. 6, it will be apparent that the illustrated variation differs from the embodiment of FIG. 5 primarily in that the rolling beta surfaces 141 on the beta body 132 extend completely to the ends of the beta body rather than to journalled shafts at the ends of the same body. As a result, an increased range of beta/omega surface radii are available for a transmission of given dimensions. This is made possible by the use of cradle bearings 153a and 153b which extend only partially about the circumference of the cones 138 and 140 at their outer or small ends. The cradle bearings 153a and 153b are located on opposite sides of the beta body and more specifically, on the side of each cone 138 and 140 opposite from the respective points of rolling friction contact P1 and P2. A more complete understanding of the construction of the cradle bearings 153a and 153b, as well as the variation in the construction of the alpha body 122a, may be appreciated from FIGS. 7 and 8 of the drawings.

As shown in FIG. 7, the alpha body 122a is again a generally circular body supported by the hub 128 and shaft 124 but of a diameter less than the length of the beta body 132. The alpha body 122a is circumscribed by a ring-like member 122b pivotally supported from the alpha body 122a by pivot axles or shafts 195 on an axis 135. As may be seen in FIG. 7, the axis 135 is perpendicular to the plane containing both the first and second axes 120 and 134, respectively, and which have been described above.

As indicated, the saddle bearings 153a and 153b are presented to opposite sides of the beta body 132 and are observed as such in FIG. 7. To effect an adjustment in the magnitude of the angle $\alpha$ of first and second axes intersection, opposing pairs of hydraulic piston/cylinder units 157 extend between ear-like formations 159 on the alpha body 122a and semicylindrical tabs 161 on the ring member 122b. The specific engagement of the piston 155 of the units 157 with the ring 122b may be observed in FIG. 8. In light of the opposed pairs of hydraulic piston/cylinder units, it will be appreciated that the bearing saddles 153a and 153b may be adjusted to carry the surfaces 141 on the cone members 138 and 140 forceably into engagement with the omega surfaces 173 at the two points of rolling friction contact P1 and P2. The connection of the saddle bearings 153a and 153b by the structure of the ring-like member 122b ensures symmetrical application of force by the piston/cylinder units 157 to opposite ends of the beta body 132.

Figure 9:
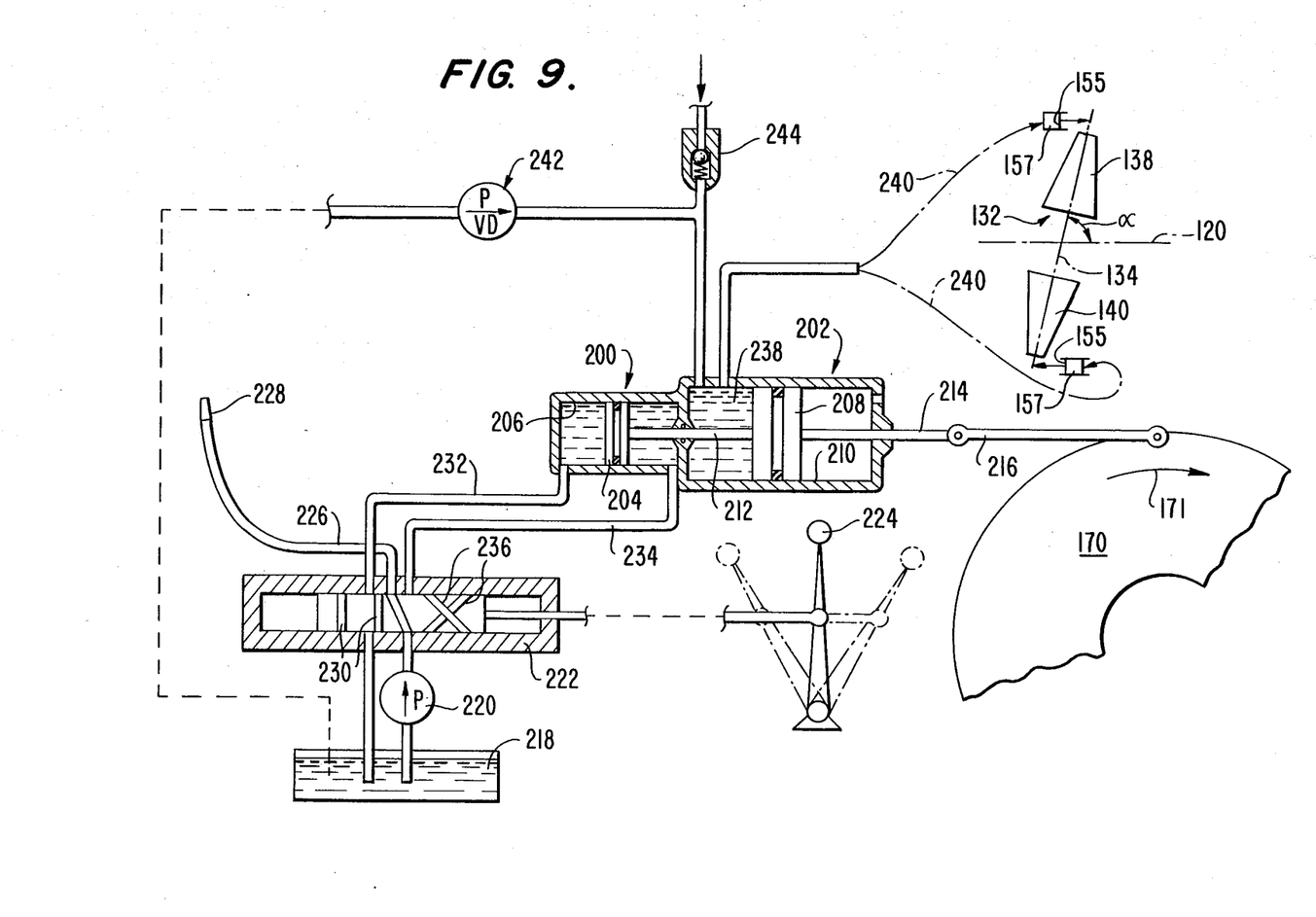
FIG. 9 is a schematic diagram illustrating a hydraulic control system for the embodiment of FIGS. 5-8.

In FIG. 9 of the drawings, a hydraulic control system is shown schematically for use particularly, though not exclusively, with the embodiments of FIGS. 5–8 of the drawings. In FIG. 9, the beta body 132 and the relevant components thereof are schematically represented together with the omega plate 170 which, when adjusted rotatably, cooperates with the ball ramps 174 to vary the distance between the omega surfaces 173. In this connection, it is to be understood that movement of the omega plate 170 in the direction of the arrow 171 will cause the plate 170 to move toward the plate 172 (FIGS. 5 and 6) as a result of the ball ramp system described above with reference to FIG. 3 of the drawings. Also in this connection, it will be recalled that such movement of the omega plates toward one another will be accompanied by an increase in the angle $\alpha$ subtending the first and second axes 120 and 134 respectively to shift the location of the contact points P1 and P2 and thus change the transmission speed ratio through variation of the radius ratio factor $p$.

The hydraulic control system includes a pair of piston/cylinder units 200 and 202, respectively. The unit 200 includes a piston 204 slidable in fluid-tight relationship with an inner cylindrical chamber 206 whereas the unit 202 includes a piston 208 similarly slidable in an interior cylindrical chamber 210. Although the pistons operate in separate cylindrical chambers 206 and 210, they are interconnected mechanically by a rod 212. The piston 208 of the unit 202 is mechanically connected directly by a piston rod 214 and link 216 to the periphery of the omega plate 170.

The piston 204, which may be considered as an "adjusting piston", is positioned by hydraulic fluid supplied from a sump 218 by a low pressure pump 220 under the control of a slide valve 222, in turn controlled by suitable means such as a manually actuated lever 224. When the slide valve is in the position illustrated in FIG. 9, the discharge of the pump 220 is fed through a line 226 to a nozzle 228 for general lubrication of parts within the casing of the transmission embodiments illustrated in FIGS. 5 and 6. When the slide valve is adjusted so that ports 230 register with lines 232 and 234, the piston 204 will be moved to the left as a result of hydraulic fluid under the pressure of the pump 220 being fed through the line 234 whereas hydraulic fluid to the left of the piston 204 is vented back to the sump 218 through the line 232. Adjustment of the slide valve so that the crossed ports 236 register with the lines 232 and 234 will effect a reversal of the direction of movement by the piston 204.

The piston 208 in the unit 202 may be termed a "forcing piston" and its movement in the cylinder 210 is effected solely by its connection via the rod 212 with the positioning piston 204. The chamber defined by the piston 208 and that part of the cylinder 210 to the left of the piston 208, as illustrated in FIG. 9, is filled with hydraulic fluid 238. The hydraulic fluid 238, moreover, fills conduits 240 extending to the cylinders 157 in which pistons 155 work to change the angle $\alpha$ of axes intersection associated with the beta body 132. A variable displacement, high pressure, low capacity, pump 242 is included to supply hydraulic fluid from the sump 218 to the chamber containing the hydraulic fluid 238 and an actuator controlled pressure release valve 244 is provided to relieve pressure developed by the pump 242.

In practice, the diameter of the piston 208 is selected so that the volumetric displacement of the hydraulic fluid 238, upon movement of the piston 208 to adjust the omega plate 170, is proportional to the fluid displacement in the beta body actuating cylinders 157 required for adjustment of the angle $\alpha$ of axes intersection to accommodate the movement of the omega plate 170. In this connection, the inclination of the ramps 76 and 78 (FIG. 3) resulting in axial movement of the plate 170 in response to rotational positioning thereof is also correlated with the volumetric displacement of the hydraulic fluid upon movement of the piston 208. Because of this relationship, movement of the piston 204 and piston 208 will result not only in axial positioning of the omega plates 170 and 172 but also of a withdrawal of hydraulic fluid from the cylinders 157 to increase the angle $\alpha$ of axes intersection or the angular inclination of the beta body 132. Such movement, which is effected by the low pressure pump 220, is primarily positional for speed ratio adjustment only. The pump 220 is not used to force the beta surfaces 141 into rolling friction engagement with the omega surfaces 173. This latter function is served by the variable displacement high pressure pump 242 simply by increasing the pressure of the hydraulic fluid 238 against the forcing piston 208. Because the high pressure pump 242 requires very low volumetric capacity and also because it may be operated between zero discharge and discharge necessary to develop the required pressure on the hydraulic fluid 238, the energy expended in forcing the respective rolling surfaces 141 and 173 into rolling friction engagement is minimized. The pressure release valve is provided to reduce pressure on the fluid 238 when the omega plate 170 is to be moved outwardly by rotation in a direction opposite to the arrow 171.

It is to be noted that torque transmitted at the points P1 and P2 of rolling friction contact will tend to rotate the omega plate from the position in which it is held by the pistons 204 and 208. The direction of this torque in the two described embodiments of the invention is in the direction of the arrow 171. As a result, excess torque will tend to move the plate 170 toward the beta body 132 and down-shift the transmission speed ratio.

Figure 10:
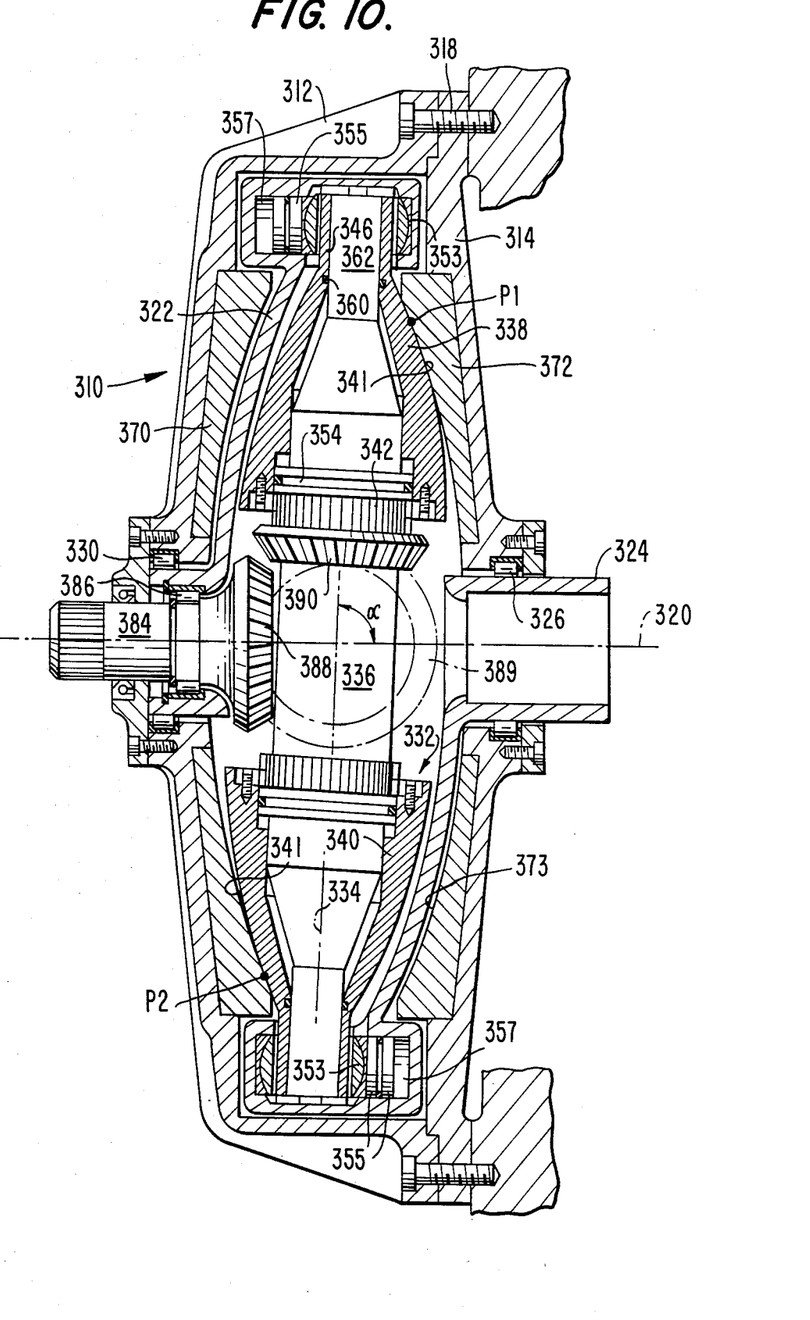
FIG. 10 is a cross section like FIG. 1 but illustrating a further embodiment of the invention.

In FIG. 10 of the drawings, a further embodiment of the invention is illustrated with parts previously identified in FIGS. 1 through 8 having the same tens and digits reference numerals but in a 300 series. As will be understood from the ensuing description, the embodiment of FIG. 10 combines features of the embodiment illustrated in FIG. 1 with features of the embodiment illustrated in FIGS. 5 and 6.

In the embodiment of FIG. 10, the beta body 332 is constructed in a manner very similar to the beta body 32 of FIG. 1. Thus, the beta body 332 includes a central shaft 336 on which a pair of cone members 338 and 340 are rotatably keyed by splines 342 for a measure of axial adjustment relative to the shaft 336. As in the embodiment of FIG. 1, hydraulic chambers are defined by spaced seals 354 and 360 between the cones 338, 340 and the central shaft 336.

The embodiment of FIG. 10, however, departs from the embodiment of FIG. 1 in that like the embodiment of FIGS. 5 and 6, the angle $\alpha$ of intersection between the first and second axes 320 and 334 is adjustable by virtue of support of the beta body at opposite ends from the alpha body 322 by spherical races 353 connected to slidable pistons 355 in cylindrical chambers 357. Thus, introduction of hydraulic fluid into the chambers 357 will reduce the size of the angle $\alpha$ whereas the exhausting of fluid from the chambers 357 will result in increasing the angle $\alpha$ toward 90°. Also like the embodiment of FIGS. 5 and 6, the torque path from the beta body 332 to the output shaft 384 is by way of a bevel gear 390 keyed to the beta body shaft 336 and meshing with an idler gear 389 journalled in the alpha body 322, to a bevel gear 388 with which the idler gear 389 is in meshing engagement.

An advantage of the embodiment of FIG. 10 is that the omega plates 370 and 372 may be fixed in a stationary, nonadjustable position directly to the casing parts 312 and 314, respectively. This feature results not only in a simplification of the reaction components of the transmission by elimination of means for adjusting the one or both of the omega plates 370 and 372, but additionally facilitates grounding the omega plates or holding them against torque transmitted between the beta and omega surfaces 341 and 373.

The hydraulic control system illustrated in FIG. 9 may be adapted to the embodiment of FIG. 10 by substituting for the mechanical linkage 214, 216, a hydraulic line communicating with the chamber to the right of the piston 208 in FIG. 9 with the chambers defined by the seals 354 and 360 between the cone members 338 and 340 and the shaft 336 in the embodiment of FIG. 10. The chamber to the right of the piston in FIG. 9 would be closed and and it, together with all lines and chambers in communication with it, would be filled with hydraulic fluid. In all other respects, the hydraulic system of FIG. 9 would be the same as that described above. It should be noted that the proportioning of hydraulic fluid operating to move the cones axially on the shaft and hydraulic fluid operating to change the angle $\alpha$ could not be predicated on the ball ramp system of FIG. 3, as in the embodiments of FIGS. 1, 5 and 6, but the configuration of the rolling surfaces 341 on the cones 338 and 340 and of the omega surfaces 373 would be designed to accommodate such proportioning.

In light of the foregoing, it will be appreciated that the geometry of these transmission embodiments 10, 110 and 310 may be characterized by the locations of the contact points P1 and P2 in relation to the first and second transmission axes 20, 120, 320 and 34, 134, 334, respectively. In particular, the rolling traction contact points P1 and P2 always lie in the area of a plane defined by the intersecting axes and more importantly, in an area subtending the first and second axes. This geometry contributes to a range of beta and omega surface configurations by which the radius ratio $\rho$ range is increased substantially over known continuously variable transmissions of the general class encompassing the present invention.

Also it will be observed that the output/input speed ratio is highest when the points of contact P1 and P2 are near the small ends of the cone members 38, 138, 338 and 40, 140, 340 in all embodiments. As a result of this, the moment arm through which the cones are held against the plates is long at high speed/low torque operation and is reduced substantially at lower speeds and correspondingly higher torques, assuming constant power. Moreover, the generally radial configuration of both transmission embodiments coupled with rotation of the alpha body and the beta body directly with the input enables the transmission to function in the manner of a flywheel so that the input shaft 24, 124, 324 may be connected directly to the crankshaft of an engine without the need for a separate flywheel.

Thus it will be appreciated that as a result of the present invention, a highly effective continuously variable transmission unit is provided by which the principal objective, among others, are completely fulfilled. It is contemplated and will be understood by those skilled in the art from the preceeding description and accompanying drawing illustrations, that changes and/or modifications may be made in the disclosed embodiment without departure from the present invention. Accordingly, it is intended that the foregoing description and accompanying drawings are illustrative only, not limiting, and that the true spirit and scope of the present invention be determined by reference to the appended claims.

I claim:

1. In a continuously variable traction drive transmission having a frame, an alpha body supported by said frame for rotation about a first axis, a beta body supported by said alpha body on a second axis intersecting said first axis at a point of axes intersection and at an acute angle of axes intersection, said beta body having a pair of members on opposite sides of said point of axis intersection for defining beta rolling surfaces of revolution about said second axis, omega body means for defining a pair of omega rolling surfaces of revolution about said first axis, said beta and omega surfaces being in rolling friction engagement at two points of contact in a plane containing said first and second axes, said two points of contact being located on opposite sides of said first axis and on opposite sides of said second axis, and means for varying the radius ratio of said beta and omega surfaces at said points of contact, the improvement comprising:
   means for defining said alpha, beta and omega bodies so that said points of contact always lie within said acute angle between said first and second axes.

2. The transmission recited in claim 1, wherein said means for varying the radius ratio of said beta and omega surfaces comprises means for adjustably positioning said omega surfaces along said first axis and means for adjustably positioning said beta body members along said second axis.

3. The transmission recited in claim 1, wherein said means for varying the radius ratio of said beta and omega surfaces comprises means for adjustably positioning said omega surfaces along said first axis and means for adjusting said acute angle of axes intersection.

4. The transmission recited in claim 1, wherein said means for varying the radius ratio of said beta and omega surfaces comprises means for adjustably positioning said beta body members along said second axis and means for adjusting said acute angle of axes intersection.

5. The transmission recited in claim 4, wherein said omega body means are fixed in said frame.

6. The transmission recited in either of claims 2, or 4, wherein said beta surfaces are axially convex and said omega surfaces are radially concave.

7. The transmission recited in claim 3, wherein said beta surfaces are axially concave and wherein said omega surfaces are radially convex.

8. The transmission recited in either of claims 3 or 4, wherein said means for adjusting said acute angle comprises translatable bearing means supporting said beta body from said alpha body and force developing means operative between said alpha body and said translatable bearing means.

9. The transmission recited in claim 8, wherein said translatable bearing means comprises unitary means supported by said alpha body for pivotal movement on an axis intersecting said point of axes intersection and perpendicular to both said first and second axes.

10. The transmission recited in claim 9, wherein said beta body is supported by cradle bearings at opposite ends, thereby presenting said beta rolling surfaces along the full length of said beta body.

11. In a continuously variable traction drive transmission having a frame, an alpha body supported by said frame for rotation about a first axis, a beta body supported by said alpha body on a second axis intersecting said first axis at an acute angle of axes intersection, said beta body having a pair of members defining beta rolling surfaces of revolution about said second axis, and an omega body defining a pair of omega rolling surfaces of revolution about said first axis, said beta and omega surfaces being in rolling friction engagement at two points of contact, the improvement comprising:

means including said alpha body for supporting said beta body on said second axis so that said points of contact lie within said acute angle of intersection;

said omega body including a pair of annular members supported by said frame on opposite sides of said beta body; and     means for adjusting said beta body in relation to said omega surfaces to vary the ratio of beta and omega rolling surface radii at said points of contact.

12. The transmission recited in claim 11, wherein said angle of axes intersection is near 90°.

13. The transmission recited in claim 11, wherein said beta body includes a shaft restrained to a position of radial balance with said alpha body, and wherein said pair of members on said beta body are oppositely convergent cone members being rotatably linked to said shaft.

14. The transmission recited in claim 11, wherein said beta rolling surfaces are axially convex and wherein said omega surfaces are radially concave.

15. The transmission recited in claim 11, wherein said beta rolling surfaces are axially concave and wherein said omega surfaces are radially convex.

16. The transmission recited in claim 11, wherein said adjusting means comprises a hydraulic system including a low pressure unit for adjusting the relative positions of said beta body and said omega surfaces and a high pressure, small capacity unit for forcing said beta and omega surfaces into rolling contact with each other.

17. The transmission recited in claim 11, comprising means for axially adjusting said annular members and including means for fixing one of said annular members to said frame, means for axially adjusting the other of said annular members, and means allowing axial movement of said alpha body to center said alpha and beta bodies between said annular members.

18. The transmission recited in claim 17, wherein said means for moving said other annular member comprises annularly oriented ramp means and means for rotatably adjusting said other annular member 19. The transmission recited in claim 17, including means for adjusting said acute angle of axes intersection in accordance with adjusting movement of said annular members.

20. The transmission recited in claim 17, including hydraulic means for adjusting both said acute angle and said other annular plate 21. The transmission recited in claim 20, wherein said hydraulic means comprises first and second cylinder units having first and second pistons therein respectively, mechanical means for connecting said first and second pistons, low pressure pump means in communication with said first cylinder unit on opposite sides of said first piston for adjusting the position of said pistons, and high pressure pump means for forcing said second piston in a direction to retain said beta and omega rolling surfaces in frictional engagement with each other.

22. The transmission as recited in claim 21, including mechanical linkage connecting said other annular member with one side of said second piston, said high pressure pump means being in communication with the opposite side of said second piston.

23. The transmission recited in claim 22, including conduit means for communicating fluid pressure at said other side of said second piston with hydraulic pistons for changing said acute angle.

* * * * *